F. R. DUDLEY.
VEHICLE WHEEL.
APPLICATION FILED MAY 21, 1909.

962,010.

Patented June 21, 1910.

Witnesses

Inventor
Frank R. Dudley.
By
Attorneys

UNITED STATES PATENT OFFICE.

FRANK R. DUDLEY, OF FITCHBURG, MASSACHUSETTS.

VEHICLE-WHEEL.

962,010.

Specification of Letters Patent. Patented June 21, 1910.

Application filed May 21, 1909. Serial No. 497,408.

*To all whom it may concern:*

Be it known that I, FRANK R. DUDLEY, a citizen of the United States, residing at Fitchburg, in the county of Worcester and State of Massachusetts, have invented a new and useful Vehicle-Wheel, of which the following is a specification.

It is the object of the present invention to provide an improved construction of vehicle wheel and the invention relates more particularly to that class of vehicle wheels which embody springs as the cushion element of the wheel and the invention aims primarily to provide, in a wheel of such construction, an arrangement and manner of attaching the spokes of the wheel, which spokes are of flat resilient metal, to the hub and to the felly, so that the securing devices employed in such attachment will not be subjected to strain; at least to any considerable degree.

It is a further object of the invention to provide a vehicle wheel of this class of such construction as to permit of the ready disassembling of the parts of the wheel so that the tires may be readily repaired or new parts substituted.

Figure 1:
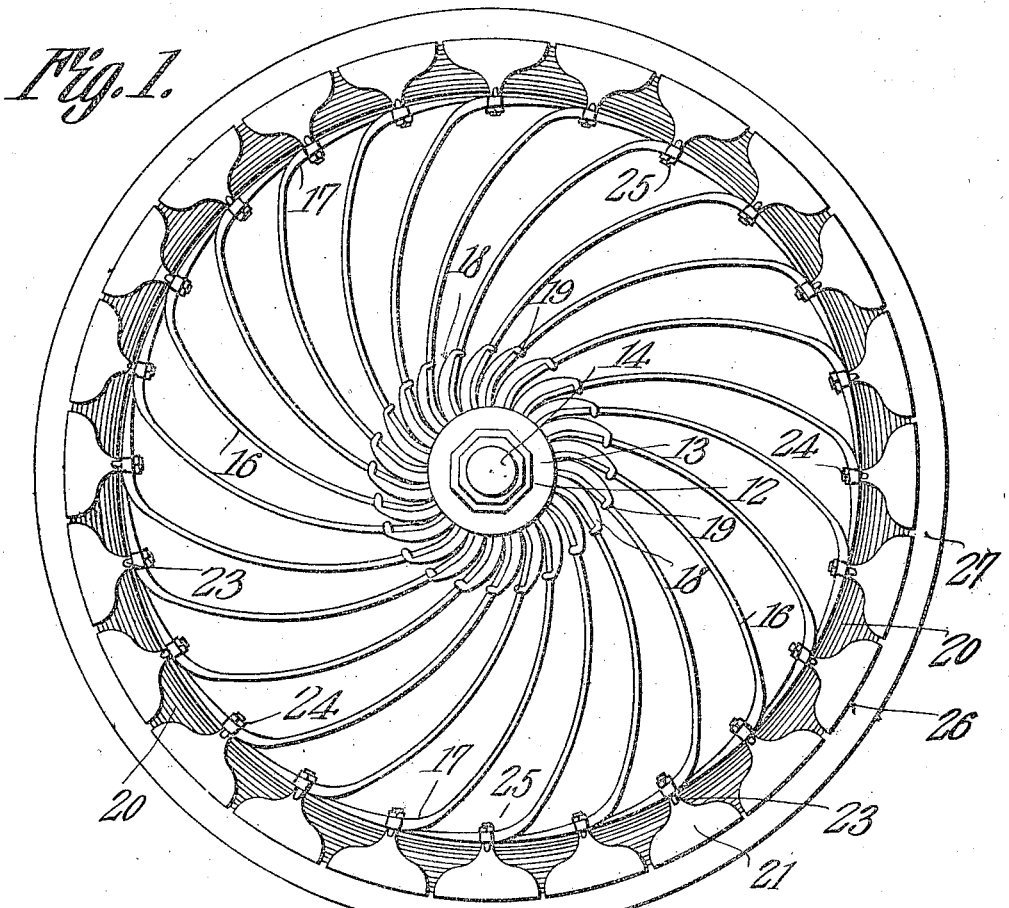
Figure 2:
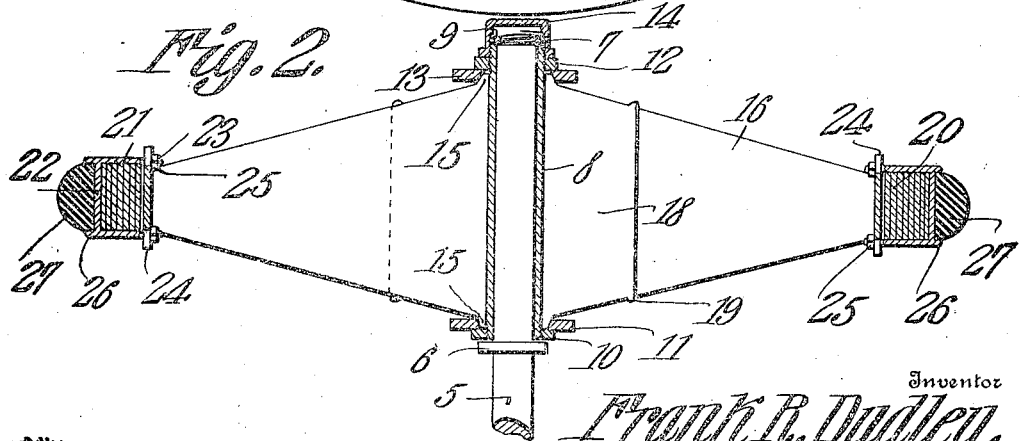

In the accompanying drawings:—Figure 1 is a view in front elevation of a vehicle wheel constructed in accordance with the present invention. Fig. 2 is a horizontal sectional view therethrough.

In the drawings, there is shown one end of a vehicle axle 5 having formed or secured thereon a collar 6 and having a threaded reduced end 7. A spindle box or sleeve 8 is fitted upon the spindle 5 and bears at one end against the collar 6 thereon and at its other end against a nut 9 which is threaded upon the reduced end 7 of the said spindle, the sleeve being in this manner retained and held in position upon the spindle. The sleeve is threaded exteriorly at its ends and threaded upon the inner end of the sleeve is a nut 10 which bears against a washer 11 disposed thereon. Similarly, a nut 12 threaded upon the other end of the sleeve bears against a washer 13 and a cap nut 14 is threaded also upon the said end of the sleeve and bears against the nut 12 and serves to lock the same in place. The openings in the washers 11 and 13 are tapered as is clearly shown in Fig. 2 of the drawings and receive wedge shaped lugs 15 which project laterally from the edges of spokes 16, it being understood that upon tightening the nuts 10 and 12, the washers 11 and 13 will be forced toward each other and will firmly clamp the inner ends of the spokes 16 to the sleeve 8 and will hold the said spokes in position so far as their said inner ends are concerned.

The spokes 16 above referred to are each in the form of a flat resilient plate which is formed at its lateral edges with the said lugs 15 and has its said lateral edges converged in the direction of its outer end as is clearly shown in Fig. 2 of the drawings, the spokes at their inner ends being of considerable width whereby to prevent "dishing" of the wheel when in use. As is illustrated in Fig. 1 of the drawings, the plates comprising the spokes 16 are terminally decreased in thickness at their inner ends and increased in thickness in the direction of their outer ends, they being of greatest thickness at a point somewhat inwardly of their said outer ends and being decreased in thickness from such point to the outer end as is indicated by the numeral 17. It is preferable, in order to properly space the inner ends of the spokes around the hub sleeve 8 and also to brace their said inner ends, that plates 18, preferably resilient, be secured upon one face of each spoke 16 at its inner end and these plates 18 are formed each at each lateral edge at the outer corners with lugs 19 which engage with the corresponding lateral edges of the associated spokes 16. Under some conditions, the engagement of these lugs 19 with the lateral edges of the plates comprising the spokes may be found sufficient to hold the plates and spokes in such relation especially if the plates are formed, as in the case of the spokes 16, with the lateral lugs 15 although it will be understood that where it is desired not to form the plates with lugs similar to the lugs 15, they may be otherwise secured to the plates comprising the spokes.

The felly of the wheel embodying the present invention is comprised in part of a coiled leaf spring 20, the laminæ of which are in contact as is clearly shown in Figs. 1 and 2 of the drawings and the spring may be comprised of as many laminae as will permit of proper yield of the felly when the wheel is in use, the outer ends of the plates 16 comprising the spokes of the wheel being secured to the laminæ of the spring comprising the body of the felly.

Clips comprising side portions 21 and connecting portions 22 are disposed upon the spring 20 comprising the body of the felly at intervals and preferably are so closely arranged as to have their opposing ends substantially in contact and these clips are formed at the inner edges of the side portions 21 with threaded studs 23 which project through apertured or notched ears 24 formed upon the lateral edges of the spokes 16 adjacent the outer ends thereof, these ears being preferably formed at the thickened portions 17 of the spokes.

Nuts 25 are threaded upon the studs 23 and not only serve to firmly clamp the clips upon the spring 20 of the felly but serve further to bind the outer ends of the spokes firmly against the innermost lamina of the spring 20, whereby the several laminæ of the spring will be held in contact and the spokes will be connected at their outer ends securely to the said spring 20.

As stated, the ears 24 are formed at the edges of the springs at their thickened portions 17 and are hence located inwardly of the ends of the said spokes so that the gradually thinned terminals of the spokes bear flat against the inner face of the innermost lamina of the spring 20 as is clearly shown in the two figures of the drawings.

The connecting portions 22 of the clips above described are preferably located inwardly of the outer edges of the side portions 21 of the clips as shown in Fig. 2 of the drawings so as to afford radially projecting flanges 26 between which may be received a rubber tire 27.

From the foregoing description of the invention, it will be seen that there is provided a vehicle wheel, in which not only the spokes but also the felly will yield to a proper degree to cushion the wheel and it will further be understood that inasmuch as the outer terminals of the spokes 16 bear flat against the inner surface of the innermost lamina of the spring 20 comprising the body of the felly, less strain will be placed upon the devices for securing the spokes at their said outer ends to the felly than would be the case should the spokes terminate at their outer ends directly at the felly. It will also be understood that by removing the cap nut 14, the nut 12 and the washer 13, the wheel may be readily disassembled for the purposes of repair or application of a new hub sleeve or for any other purpose. Also it will be understood that while the resilient plates 16 comprising the spokes of the wheel are comparatively thin at their inner and outer ends and are comparatively thick adjacent their said outer ends, they may be otherwise proportioned as regards their thickness as found expedient, this method of proportioning the spokes being however apparently the one producing the most desirable result.

What is claimed is—

1. In a wheel, a coil spring felly, clips embracing the laminæ of the felly, said clips having inwardly projecting studs, and spokes secured at their inner ends to the hub and provided at their outer ends with lateral ears through which the studs of the clips project, and nuts threaded upon the said studs and securing the spokes at their outer ends to the felly.

2. In a vehicle wheel, a hub, a coil spring felly, and spokes secured at their inner ends to the hub and at their outer ends to the felly, said spokes comprising each a resilient plate having its lateral edges converging in the direction of the outer end, the spokes being secured inwardly of their ends to the said felly and bearing beyond their points of attachment to the felly against the inner surface of the felly, the said end portions of the spokes being terminally decreased in thickness.

In testimony that I claim the foregoing as my own, I have hereto affixed my signature in the presence of two witnesses.

FRANK R. DUDLEY.

Witnesses:
ELLA M. DUDLEY,
EDWIN E. DUDLEY.